May 14, 1940.                H. F. HAGEMEYER                2,201,038

DRYING APPARATUS AND METHOD

Original Filed July 22, 1936

INVENTOR.
HENRY F. HAGEMEYER
BY Robert W. Beach
ATTORNEY.

Patented May 14, 1940

2,201,038

UNITED STATES PATENT OFFICE 2,201,038

DRYING APPARATUS AND METHOD

Henry F. Hagemeyer, Chicago, Ill., assignor to Castings Patent Corporation, a corporation of Illinois Continuation of application Serial No. 91,897, July 22, 1936. This application May 5, 1938, Serial No. 206,150

9 Claims. (Cl. 34—12)

My invention relates to a drier well adapted for use in drying articles made of plastic materials, for example, molds having gypsum as a principal ingredient. More particularly, my invention involves the provision of a novel grid structure and its method of use in the drying of such articles. This application is a continuation of my application Serial No. 91,897, for Drying apparatus, filed July 22, 1936.

In the preparation of molds made of plastic material, such as gypsum in conjunction with a strengthening substance which may be asbestos, the soft, water saturated mold is removed from the match plate and flask and dried in an oven. Heretofore during such drying the molds have often tended to warp, to crack, and to stick to the support upon which the mold rested while in the drier. The warping and cracking have prevented the mold halves registering accurately when placed face to face in pouring relation, and the cracks have either rendered the mold unfit for service or resulted in the casting being inaccurate and having an irregular surface, often duplicating the line of the crack. Sticking of the mold to its support has tended to set up stresses which further induce cracking during drying, and when it is attempted to remove the mold from its support, pieces are often pulled or broken off the fragile mold. These effects are more pronounced when the drying operation takes place quickly.

I have devised a way in which to overcome these difficulties normally inherent in the drying of molds and other articles of plastic material by employing a specially constructed and supported grid which is employed in a unique manner. The grid includes radiating bars upon which the mold is carried and with relation to which the mold slides locally by reason of the contracting movement of the mold as it dries. Moreover, the grid is supported at three points so that no warping of its surface occurs by unequal expansion of the grid supporting structure.

My principal object is, therefore, to provide a mold contacting support for a drier which, when properly employed, will have a local sliding movement with respect to the mold during the drying operation, so that, by reason of such movement the mold will be kept sheared free from the support at all times.

A further object is to provide a mold supporting structure which is suspended in such manner as to maintain the mold supporting bars always in planar relation and to prevent warping of the bar supporting structure during expansion or contraction of elements of the mold support produced by heating or cooling thereof.

Another object of my invention is to eliminate internal stresses and fractures in the mold arising from warping of the mold sustaining structure, or from local adhesion of the mold thereto during drying or when being removed from the mold support.

Other objects will appear from the following detailed description of my invention, the particular features of novelty being pointed out in the claims appended to this specification. The drawing shows a typical embodiment of the device for illustrative purposes.

Figure 1:
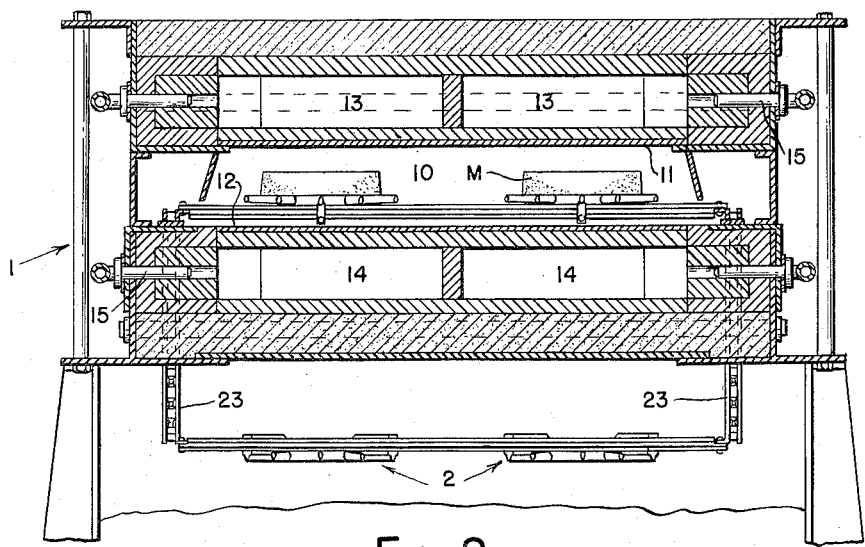
Fig. 1 is a transverse section through a drying oven.

The oven 1 consists generally of a drying chamber 10 between an imperforate upper radiant plate 11 and an imperforate lower radiant plate 12. The upper plate is heated by an upper heating chamber 13 above the plate 11, and the lower plate is heated by a lower heating chamber 14 beneath the plate 12, the drying chamber 10 in turn being heated by conduction through such plates. These heating chambers are fired by suitable means such as gas burners 15. The oven is described in more detail in my application Serial No. 206,151, filed May 5, 1938, for Mold drying method and apparatus.

Within the drying chamber 10 is a mold supporting grid 2 which is disposed to support a mold M with its upper surface adjacent to the plate 11 and with its lower surface adjacent to the plate 12, so as to be subjected to direct radiant heat from the surfaces of such plates. Preferably the mold surfaces are substantially equidistant from the heat radiating surfaces. It is also preferable that the mold, during the drying operation, be moved continuously relative to these surfaces, and for that reason the mold supporting grid is carried by bars 20 and 21 extending between conveyor chains 23 and moved thereby from one end of the oven to the other.

Figure 3:
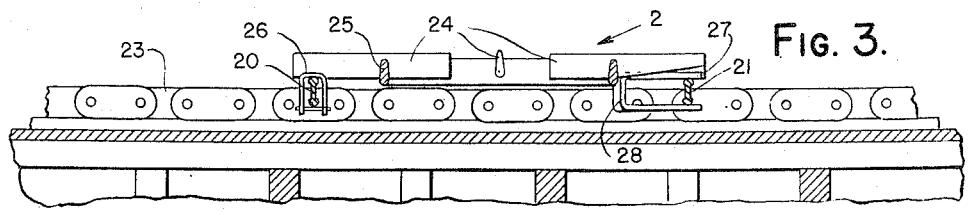
Fig. 3 is a sectional view taken on line 3—3 of Fig. 2.
Figure 4:
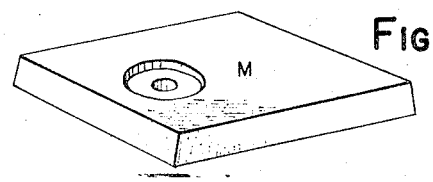
Fig. 4 is a perspective view of a representative mold which may be dried on the supporting grid in the drier.

Each mold supporting grid 2 consists of a plurality of narrow bars 24 disposed along lines radiating from a common point. These bars are held in place with relation to each other by an interconnecting frame, shown in the form of a ring 25 which engages and supports each of the bars 24, preferably being integral with each bar at a location adjacent to the inner end thereof. The frame, as shown in Fig. 3, is wholly below the upper edges of the bars 24, and all such upper edges are disposed in precisely coplanar relationship to maintain the flat back of the mold unwarped.

The bars 20 and 21, it will be seen, lie alongside opposite edges of the grid structure, and one grid edge is secured to the bar 20 by a single central connection 26, while the opposite grid edge is secured to the other bar 21 by two spaced connections 27. These connections have some play in them so that despite warping or relative tilting of the bars 20 and 21 the grid, being supported at three points, will not be warped to displace the upper edges of bars 24 from their coplanar relationship. In addition, since the bars 20 and 21 are shown as fixedly secured to the chain, the connection at one edge of the grid must be capable of sliding transversely of its bar, illustrated as the connections 27. When the chain follows the arc of its sprocket at the ends of its travel, therefore, the rigid grid structure will lie upon a chord of the sprocket circle, which, being shorter than the subtended arc, will cause the bar 21 to slide toward the backs 28 of the U-shaped connections 27.

Figure 2:
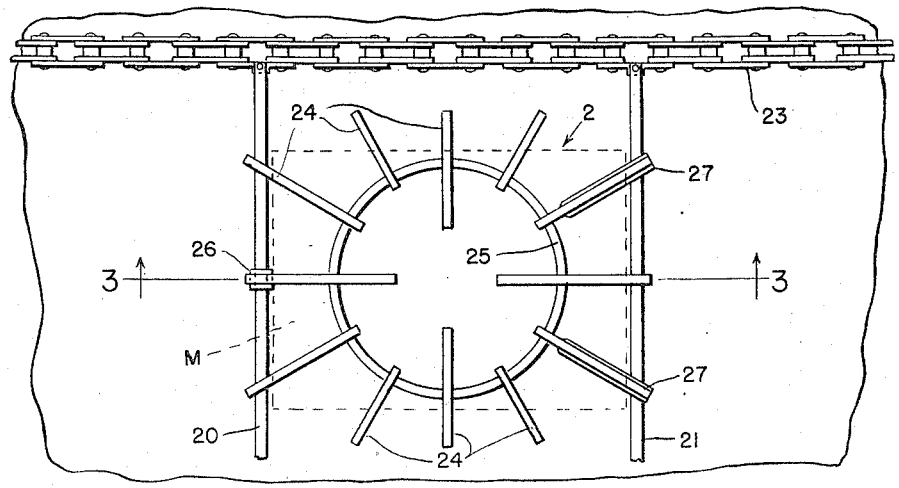
Fig. 2 is a fragmentary plan view of the conveyor structure carrying a mold supporting grid.

In operation, a mold M should be placed as symmetrically as possible upon the grid 2, as indicated by broken lines in Fig. 2, to dispose its center over the point from which the bars 24 radiate. As the mold and its support moves into or is placed in the oven, the heat begins to expand the metal supporting structure. The ring 25 increases in circumference and hence in radius, moving outwardly the interengaged inner ends of the bars 24. Each bar 24 elongates individually, the free outer end moving outward farthest and most rapidly, the movement progressively diminishing toward the central portions of the bar. Until the grid structure approaches the temperature of the oven, therefore, all mold contacting parts of the bars are moved in a radially outward direction.

As the mold itself is heated up and dried out, however, it contracts, its local marginal portions moving toward its center, and hence toward the center of radiation of bars 24. Until the mold is thoroughly dry, therefore, there is a continuous differential local sliding and shearing movement between the mold and the grid lengthwise of bars 24, the movement of local portions of the former being radially inward and that of the latter being radially outward. Such shearing action, being wholly lengthwise of the bars 24, is maximum for the movement of the parts and keeps the soft mold from adhering to the grid. Also because such movement is entirely lengthwise of the bars, they have minimum tendency to scrape and thus to mar the contacted surface of the mold during such movement.

As my invention I claim:

1. The drying method which comprises supporting a gypsum-base mold, for use as a casting matrix and having a substantially flat, lower, support engaging surface, solely upon narrow bars contacting such lower surface only along lines generally radiating from its central portion, and subjecting the mold to heat at a temperature and for a length of time sufficient to cause marginal portions of the mold to move progressively toward its center as the mold shrinks, thereby producing sliding of local areas of the contacted mold surface upon the supporting bars lengthwise thereof, thus preventing adhesion between the contacted mold surface and such supporting bars.

2. The mold drying method which comprises supporting a gypsum base mold, for use as a casting matrix and having a substantially flat, lower, support engaging surface, solely upon narrow metal bars contacting such lower surface only along lines generally radiating from its central portion, holding the inner ends of the bars against relative movement, and subjecting the mold and bars to heat at a temperature and for a length of time sufficient to effect progressive movement of marginal portions of the mold toward its center as it shrinks and progressive elongation of the metal bars from their inner ends outward, thus producing maximum relative local sliding movement between such mold surface and the bars lengthwise thereof, to prevent adhesion between the mold and the bars.

3. In a drier for gypsum-base molds for use as a casting matrix, a mold enveloping oven including closely spaced upper and lower imperforate heat radiating plates disposed adjacent to the upper and lower surfaces of a mold therebetween, sources of heat disposed above the upper and below the lower heat radiating plates for heating said plates, a mold supporting grid engaging the lower surface of such a gypsum-base mold and disposed above the lower heat radiating plate, and including a plurality of radial bars fixed with respect to each other, for local sliding of the mold on said bars lengthwise thereof by movement of marginal portions of such mold toward its center as it shrinks during drying, to prevent adhesion of the mold to said bars, and means for supporting said grid thus disposed within said oven and above the lower heat radiating plate.

4. In a drier for gypsum-base molds for use as a casting matrix, a mold enveloping oven, spaced conveyor chains moving through said oven, two spaced parallel rods carried by and extending between said chains, and a mold supporting grid supported by said rods and including a plurality of radial bars engageable with the lower surface of such a gypsum-base mold drying on said grid, for local sliding of the mold on said bars lengthwise thereof by movement of marginal portions of such mold toward its center as it shrinks during drying, to prevent adhesion of the mold to said bars, and a bar supporting frame depressed below the upper surface of said bars and rigidly interconnecting the bars into a unitary structure.

5. In a drier, a conveyor for carrying articles to be dried through a drying chamber, comprising spaced endless chains, rods extending between and secured to said chains, and a grid secured to one of said rods and slidably journaled on another of said rods, said grid comprising a ring, and a plurality of bars integral with said ring and extending radially with respect thereto, whereby a plastic material drying on said grid may slide on said bars to contract toward the center of the ring.

6. In a drier for gypsum-base molds for use as a casting matrix, a supporting grid including a ring, a plurality of radial bars supported wholly from said ring by their inner ends, and projecting in coplanar relationship thereabove, said bars being engageable with the lower surface of such a gypsum-base mold for local differential sliding relative thereto lengthwise of such bars by shrinking of the mold during drying and outward elongation of the bars by being heated, to prevent adhesion between the mold and said bars.

7. In a plastic mold drier, a grid including a plurality of grid bars disposed with their upper surfaces in coplanar relationship, and a frame interconnecting said bars, two parallel support bars disposed one along each of two opposite grid edges, a single connection between one of said support bars and the adjacent grid edge and disposed centrally of such edge, and two spaced connections between the other of said support bars and the adjacent grid edge.

8. In a drier for molds, a plastic mold supporting grid including a ring, and a plurality of radial bars integral with and projecting in coplanar relationship above said ring, engageable with the lower surface of a mold for local sliding relative thereto lengthwise of such bars by movement of marginal portions of such mold toward its center as it shrinks during drying, to prevent adhesion of the mold to said bars, two parallel support bars disposed one along each of two opposite grid edges, a single connection between one of said support bars and the adjacent grid edge and disposed centrally of such edge, and two spaced connections between the other of said support bars and the adjacent grid edge.

9. In a drier for gypsum-base molds for use as a casting matrix, a supporting grid including a plurality of radial bars disposed with their upper edges coplanar and engageable with the lower surface of such a gypsum-base mold, and a frame interconnecting said bars adjacent to their inner ends and disposed wholly below the upper edges thereof, restraining such inner bar ends against substantial relative movement, the outer ends of said bars being unrestrained for outward elongation by being heated during drying of such mold, for local sliding lengthwise relative to such mold to prevent adhesion of the mold to said bars.

HENRY F. HAGEMEYER.